United States Patent [19]
Pearson et al.

[11] Patent Number: 6,099,671
[45] Date of Patent: Aug. 8, 2000

[54] METHOD OF ADHERING CERAMIC FOAMS

[75] Inventors: William Robert Pearson, Huntington Beach; David Eric Daws, Long Beach, both of Calif.

[73] Assignee: Northrop Grumman Corporation, Los Angeles, Calif.

[21] Appl. No.: 09/081,761

[22] Filed: May 20, 1998

[51] Int. Cl.$^7$ .................... B32B 31/26; B32B 31/12
[52] U.S. Cl. ................ 156/89.11; 156/94; 156/98
[58] Field of Search .................. 156/89.11, 78, 156/94, 98

[56] References Cited

U.S. PATENT DOCUMENTS

| | | | |
|---|---|---|---|
| 2,955,952 | 10/1960 | Herbst | 117/2 |
| 3,902,940 | 9/1975 | Heller, Jr. et al. | 156/79 |
| 4,409,270 | 10/1983 | Faber et al. | 428/63 |
| 4,559,244 | 12/1985 | Kasprzyk et al. | 427/227 |
| 4,605,595 | 8/1986 | Tsang et al. | 428/413 |
| 4,856,887 | 8/1989 | Wakugawa et al. | 350/641 |
| 4,981,820 | 1/1991 | Renlund et al. | 501/39 |
| 5,082,805 | 1/1992 | Ali et al. | 501/91 |
| 5,180,694 | 1/1993 | Renlund et al. | 501/12 |
| 5,441,919 | 8/1995 | Park et al. . | |
| 5,668,188 | 9/1997 | Whinnery et al. | 423/345 |
| 5,834,108 | 11/1998 | Shimai et al. . | |
| 5,851,460 | 12/1998 | Bauer et al. . | |
| 5,928,448 | 7/1999 | Daws | 156/94 X |

FOREIGN PATENT DOCUMENTS 40 29 383   3/1992   Germany .

*Primary Examiner*—Curtis Mayes
*Attorney, Agent, or Firm*—Terry J. Anderson; Karl J. Hoch, Jr.

[57] ABSTRACT

In accordance with the present invention, there is provided a method for adhering a first ceramic foam to a second ceramic foam. The method begins with impregnating a liquid resin with reinforcement fibers to form a liquid reinforced bonding resin. The liquid reinforced bonding resin is then applied to at least one of the ceramic foams. The foams are joined to each other with the liquid reinforced bonding resin disposed therebetween. The liquid reinforced bonding resin is cured to form a solid reinforced bonding resin. The solid reinforced bonding resin is pyrolyzed for adhering the first and second ceramic foams to form a ceramic bonding layer. The ceramic bonding layer is characterized by a porous ceramic matrix with reinforcement fibers disposed therein.

34 Claims, 2 Drawing Sheets

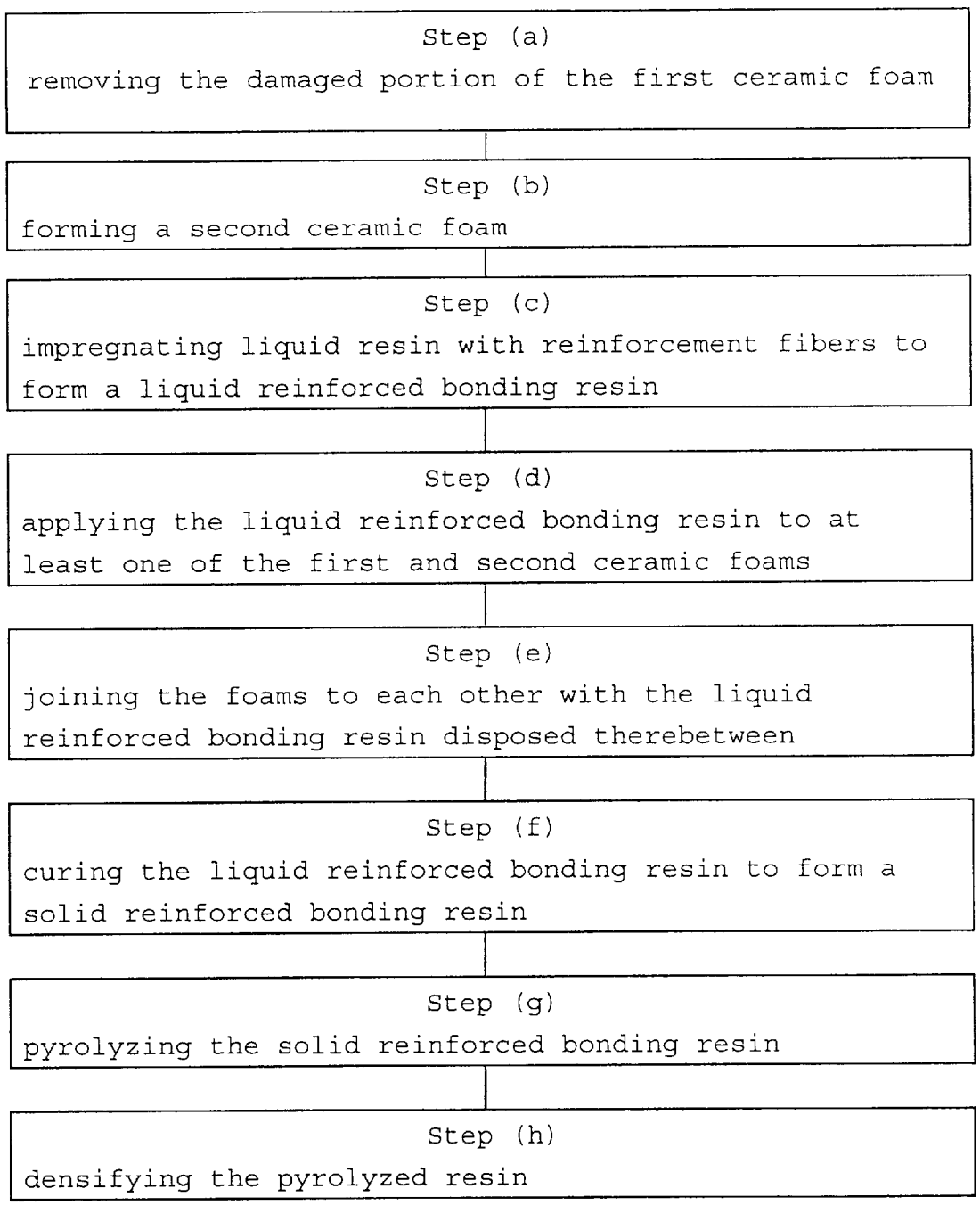

METHOD OF ADHERING CERAMIC FOAMS

FIELD OF THE INVENTION

The present invention relates generally to ceramic foam materials, and more particularly to a method of adhering and/or repairing ceramic foam materials using a fiber reinforced pre-ceramic resin.

BACKGROUND OF THE INVENTION

Ceramic foam materials are known in the art. Ceramic foams may be formed of a variety compositional materials and include, but are not limited to, silicon carbide (SiC), boron carbide ($B_4C$), hafnium carbide (HfC), tantalum carbide (TaC), zirconia ($ZrO_2$), alumina ($Al_2O_3$), hafnium dioxide ($HfO_2$), magnesium oxide (MgO), silicon dioxide ($SiO_2$), yttria ($Y_2O_3$), silicon nitride ($Si_3N_4$), aluminum nitride (AlN), boron nitride (BN), hafnium nitride (HfN), titanium boride ($TiB_2$), cordierite ($MgO-Al_2O_3-SiO_2$), and mullite ($3Al_2O_3-2SiO_2$). An example of a particular application of a ceramic foam is chemically vapor deposited silicon carbide (CVD-SiC) foam which is used as bulk structural material. Particularly in the aerospace industry, such foam has applications for internal reinforcement of high temperature structures, such as ceramic composite trailing edges of aerodynamic surfaces. Other applications of ceramic foams include heat exchangers, engine components, aerospace structures, baffles, diesel exhaust filters, particulate filters, catalyst supports, radomes, re-entry shields, heating elements, noise suppressors, bearings, solar collectors, thermal regenerators, mirror supports, brake pads, and kiln furniture.

In order to facilitate practical application of such ceramic foams, however, there is a need in the art for methods of adhering and repairing such foams. In particular, it is desirable to adhere similar ceramic foam to each other such as in the case where a portion of ceramic foam is damaged. In this respect, a repair plug formed of the same type of material (and therefore having the same mechanical and chemical attributes) is often desirable to be used.

It is therefore evident that there exists a need in the art for a method of adhering ceramic foams which is relatively simple yet effective.

SUMMARY OF THE INVENTION

In accordance with the present invention, there is provided a method for adhering a first ceramic foam to a second ceramic foam. The method begins with impregnating a liquid resin with reinforcement fibers to form a liquid reinforced bonding resin. The liquid reinforced bonding resin is then applied to at least one of the ceramic foams. The foams are joined to each other with the liquid reinforced bonding resin disposed therebetween. The liquid reinforced bonding resin is cured to form a solid reinforced bonding resin. The solid reinforced bonding resin is pyrolyzed for adhering the first and second ceramic foams to form a ceramic bonding layer. The ceramic bonding layer is characterized by a porous ceramic matrix with reinforcement fibers disposed therein. It is contemplated that the ceramic matrix bonds the first and second ceramic foams while the reinforcement fibers structurally support the ceramic matrix disposed within the bonding layer.

Preferably, the reinforcement fibers are formed of a ceramic material which may generally match the chemical composition of the foams and may be formed of silicon carbide whiskers, for example. The liquid reinforced bonding resin is substantially monomeric and when cured becomes a polymeric material. Where the solid reinforced bonding resin is not of an oxide type of ceramic, the pyrolysis process may be effectuated in a substantially inert atmosphere to prevent undesirable oxidation. In addition, the ceramic bonding layer may be further characterized by chemical bonds formed between the porous ceramic matrix and at least one of the first and second ceramic foams during pyrolysis. In this respect, a transition material is created which is compositionally a combination of the ceramic matrix and the adjacent foam. In order to provide additional adhesive strength, the bonding layer may be densified subsequent to the initial pyrolysis procedure. In another embodiment of the present invention, there is provided a method for repairing a damaged ceramic foam as facilitated by the creation of a bonding layer as described above.

Advantageously, the present invention utilizes simple commercially available component materials, i.e., the liquid resin and reinforcement fibers, to bond the foams together. In addition, the general process steps of curing and pyrolysis are well known in the art. Thus, no specialized tooling or equipment are necessarily required, other than that which is normally used in the art to effectuate curing and pyrolysis. In this respect, the present invention incorporates a simple two component bonding adhesive which is cured and pyrolyzed to create a chemical/mechanical bond between two ceramic foams.

Accordingly, the present invention represents a significant advance in the art.

BRIEF DESCRIPTION OF THE DRAWINGS

These, as well as other features of the present invention, will become more apparent upon reference to the figures wherein:

FIG. 2 is a flow chart of the method repairing ceramic foams of another embodiment of the present invention.

DETAILED DESCRIPTION OF THE PREFERRED EMBODIMENT

Figure 1:
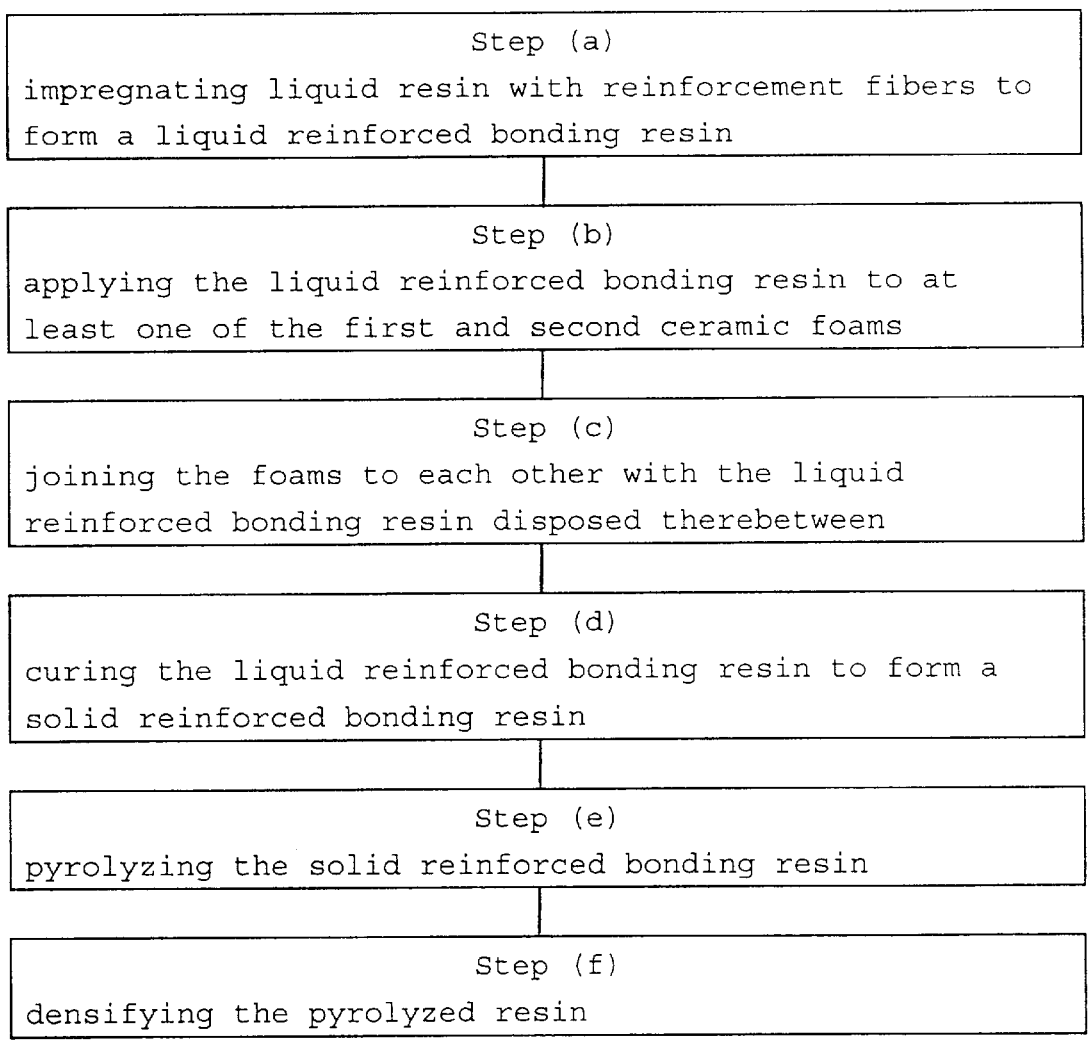
FIG. 1 is a flow chart of the method adhering ceramic foams of the present invention.

Referring now to the figures wherein the showings are for purposes of illustrating a preferred embodiment of the present invention only, and not for purposes of limiting the same, FIGS. 1–2 illustrate flowchart of steps in accordance with the method of the present invention.

In accordance with the present invention, there is provided a method for adhering a first ceramic foam to a second ceramic foam. As used herein, a ceramic refers or relates to materials which have as their essential component, and are composed in large part of, inorganic nonmetallic materials. Ceramics include not only materials such as pottery, porcelain, refractories, structural clay products, abrasives, porcelain enamels, cements, and glass but also though not limited to nonmetallic magnetic materials, ferroelectrics, manufactured single crystals, and glass-ceramics. It is contemplated that the ceramic foams may be of any number of compositions which are well known to one of ordinary skill in the art. Ceramic foams may be formed of a variety compositional materials and include, but are not limited to, silicon carbide (SiC), boron carbide ($B_4C$), hafnium carbide (HfC), tantalum carbide (TaC), zirconia ($ZrO_2$), alumina ($Al_2O_3$), hafnium dioxide ($HfO_2$), magnesium oxide (MgO), silicon dioxide ($SiO_2$), yttria ($Y_2O_3$), silicon nitride ($Si_3N_4$), aluminum nitride (AlN), boron nitride (BN), hafnium nitride (HfN), titanium boride ($TiB_2$), cordierite ($MgO$—$Al_2O_3$—$SiO_2$), and mullite ($3Al_2O_3$—$2SiO_2$).

Referring now to FIG. 1 there is illustrated a flowchart of the steps of the method of the present invention. The method begins with impregnating a liquid resin with reinforcement fibers to form a liquid reinforced bonding resin. The liquid resin is one which may be ceramized upon pyrolyzation. Such a resin, also referred to as a pre-ceramic resin and/or a ceramic precursor resin, may be chosen from those well known to one of ordinary skill in the art. Examples of final products of these resins include silicon nitrocarbide (SiNC), silicon carbide (SiC), aluminosilicate ($3Al_2O_3$—$2SiO_2$), silicon oxycarbide (SiOC), Starfire (SiC precursor), Tonen ($Si_3N_4$) and silicon dioxide ($SiO_2$ precursor). The liquid resin preferably has a viscosity and consistency high enough to facilitate mixture and suspension of the reinforcement fibers. As such, although not required, the resin as a practical matter will likely be substantially monomeric in nature and is between 60 to 90 weight percent in relation to the weight percent of the reinforcement fibers.

The reinforcement fibers may take the form of ceramic fibers and may generally match the chemical composition of at least one of the first and second ceramic foams. Thus, where the first and second ceramic foams are formed of silicon carbide, the reinforcement fibers are preferably formed of silicon carbide. The fibers are preferably of a whisker type fiber and have an aspect ratio of greater than fifteen. It is contemplated physical attributes of the fibers which may relate to, for example, melting point, degradation temperature, thermal expansion, and thermal conductivity, will be considered when selecting a fiber material.

The liquid reinforced bonding resin is applied to at least one of the ceramic foams. The foams are joined to each other with the liquid reinforced bonding resin disposed therebetween. The liquid reinforced bonding resin is then cured to form a solid reinforced bonding resin. As one of ordinary skill in the art will appreciate, the curing temperature and duration is dependent upon the particular liquid resin used. Such curing temperatures, however, may typically be between 100 and 350 degrees F. Depending upon the physical size and configuration of the foams, a curing oven or a portable heater may be utilized.

The solid reinforced bonding resin is pyrolyzed to form a ceramic bonding layer. The ceramic bonding layer is characterized by a porous ceramic matrix with reinforcement fibers disposed therein. As one of ordinary skill in the art will appreciate, the pyrolysis temperature and duration is dependent upon the particular pre-ceramic resin used. Such pyrolysis temperatures, however, may typically be between 1000 and 2000 degrees F. Depending upon the physical size and configuration of the foams, an oven or a portable heating device may be utilized. It is contemplated that due to the relatively high temperature and other environmental conditions that exist during pyrolysis, the intermediate curing process mitigates volume loss of resin material. The particular pre-ceramic resin specified is contemplated to be chosen from those well known to one of ordinary skill in the art. Such resin will ceramize to form a ceramic matrix which is compatible with the operating temperature of the first and second ceramic foams. Compatibility refers to material physical and chemical attributes which include, but not limited to, melting point, degradation temperature, thermal expansion, and thermal conductivity.

Importantly, because the curing process results in a solidified material, the reinforcement fibers become set in place and provide an interconnected support structure for the ceramic matrix. In this respect, the solid reinforced bonding resin initially occupies a bondline volume. Upon pyrolysis, the ceramic bonding layer substantially occupies the bondline volume and contains localized voids which are disposed within a porous ceramic matrix and about the reinforcement fibers. It is contemplated that in the absence of the reinforcement fibers, upon pyrolysis, the solidified resin would ceramize and the bondline volume would not be completely filled and would be subject to self-destructive shrinkage.

During the pyrolysis process, the first and second foams may chemically react with the ceramized resin. Thus, the ceramic bonding layer may be further characterized by chemical bonds formed between a porous ceramic matrix and at least one of the first and second ceramic foams during pyrolysis. Such chemical bonds are contemplated to enhance the adhesive strength between the bonding layer and the foams. Furthermore, a transition material may be created during pyrolysis which is disposed between the porous ceramic matrix and the foams. The transition material is the product of the chemical reaction between the ceramic matrix and the foams. For example, where the ceramic foams are formed of silicon carbide (SiC) and the solidified resin is composed of a $SiO_xC_y$ material, during pyrolysis a $SiO_xC_y$ material may be created. Other examples include using $Al_2O_3$ foam and $SiO_2$ based resin which forms $Al_2O_3$—$SiO_2$; $Si_3N_4$ foam and SINC based resin which forms $Si_xN_yC_z$; $ZrO_2$ foam and $SiO_xC_y$ based resin which forms $ZrSiO_xC_y$; and $Y_2O_3$ foam and $Al_2O_3$—$SiO_2$ based resin which forms $Y_2Al_xSi_yO_z$. The transition material may have undesirable physical attributes which may relate to, for example, melting point, degradation temperature, thermal expansion, and thermal conductivity. In practice, for example, given that the first and second ceramic foams are subject to a particular operating temperature, it is undesirable for the transition material to have a melting temperature less than such operating temperature or else the bonding layer will not sufficiently adhere to the foam. Accordingly, as one of ordinary skill in the art will appreciate the particular solidified resin may be selectively chosen so as avoid chemical reaction with the first and second ceramic foams which may produce a transition material having undesirable physical attributes.

It is contemplated that where the solidified resin is not of an oxide type of ceramic, the pyrolysis process may be effectuated in an inert atmosphere to prevent undesirable oxidation. Examples of atmospheres which mitigate oxidation are inert atmospheres such as helium, argon, nitrogen and others which are well known to one of ordinary skill in the art.

In addition, in order to further strengthen the bonding layer, the ceramic bonding layer may be densified. Preferably, such densification process includes impregnating a secondary liquid resin into the ceramic bonding layer, curing the secondary liquid resin to form a secondary solid resin and pyrolyzing the bonding layer to ceramize the secondary solid resin.

Referring now to FIG. 2, in another embodiment of the present invention, there is provided a method for repairing a damaged ceramic foam. The method provides for repairing a first ceramic foam having a damaged portion by initially removing the damaged portion of the first ceramic foam to form an engagement surface on the first ceramic foam. A second ceramic foam is sized and configured to engage the engagement surface of the first ceramic foam where the damaged portion was removed. Reinforcement fibers are suspended in a liquid resin to form liquid reinforced bonding resin, as discussed above. The liquid reinforced bonding resin is applied to at least one of the first and second ceramic foams which are then joined to each other with the resin disposed therebetween. As discussed above, such a liquid reinforced bonding resin may be cured and subsequently pyrolyzed to produce a ceramic bonding layer to adhere the first and second ceramic foams.

In order to test the above described methods of the present invention, a six inch by six inch by one inch thick base foam (Amercom CVD-SiC foam) was damaged by impacting it several times with a ball-peen hammer. A damaged area resulted which was approximately 0.8 inch in diameter and 0.1 inch deep. The damaged area was removed using a router device which resulted in an inner surface defined by a hemispherical routed-out area which was three inches in diameter by 0.4 inches deep. A four inch by six inch piece of Amercom CVD-SiC foam was used to manufacture a repair plug for placement within the routed-out area of the damaged base foam. The plug was sized such that it protruded approximately 0.1 inch out of the base foam after placement within the routed area. A liquid bonding mixture composed of 24 weight percent silicon carbide whiskers/76 weight percent catalyzed 489D resin (manufactured by AlliedSignal, Inc.) was produced and applied to the inner surface of the routed-out area of the damaged base foam. The repair plug was then pressed into the routed-out area of the damaged base foam to construct a foam system. The foam system was heated at 350 degrees to cure the liquid resin to form a solid resin. The foams including the now solidified resin was then pyrolyzed in an inert atmosphere via a normal Blackglas (manufactured by AlliedSignal, Inc.) pyrolysis run to ceramize the resin. After completion of the repair, a two inch diameter metal fixture was bonded onto the three inch diameter repair plug. The base foam was constrained and a tensile force perpendicular to the base foam was applied via the fixture until failure of the repair occurred. The repaired area failed at a load of 358 pounds. The failure was a rough multi-mode break within the plug material adjacent the bondline. The foam material of the repair plug remained firmly adhered to the base foam with the bondline fully intact.

Additional modifications and improvements of the present invention may also be apparent to those of ordinary skill in the art. Thus, the particular combination of steps described and illustrated herein is intended to represent only one embodiment of the present invention, and is not intended to serve as limitations of alternative devices within the spirit and scope of the invention.

What is claimed is:

1. A method for adhering a first ceramic foam to a second ceramic foam, the method comprising the steps of:
    (a) impregnating a liquid resin with reinforcement fibers to form a liquid reinforced bonding resin;
    (b) applying the liquid reinforced bonding resin to at least one of the first and second ceramic foams;
    (c) joining the first and second ceramic foams to each other with the liquid reinforced bonding resin disposed therebetween;
    (d) curing the liquid reinforced bonding resin to form a solid reinforced bonding resin; and
    (e) pyrolyzing the solid reinforced bonding resin for adhering the first and second ceramic foams to form a ceramic bonding layer, said ceramic bonding layer characterized by a porous ceramic matrix with reinforcement fibers disposed therein.

2. The method of claim 1 wherein the solid reinforced bonding resin occupying a bondline volume and the ceramic bonding layer substantially occupying the bondline volume.

3. The method of claim 1 wherein the ceramic bonding layer being further characterized by voids disposed within a porous ceramic matrix.

4. The method of claim 1 wherein the reinforcement fibers being formed of a ceramic material.

5. The method of claim 4 wherein the reinforcement fibers being formed of silicon carbide.

6. The method of claim 4 wherein the reinforcement fibers substantially match the chemical composition of at least one of the first and second ceramic foams.

7. The method of claim 6 wherein at least one of the first and second ceramic foams being formed of silicon carbide and the reinforcement fibers being formed of silicon carbide.

8. The method of claim 1 wherein the reinforcement fibers being whisker fibers.

9. The method of claim 1 wherein the reinforcement fibers having an aspect ratio of greater than 15.

10. The method of claim 1 wherein step (a) includes providing 10 to 40 weight percent reinforcement fibers.

11. The method of claim 1 wherein step (a) includes suspending reinforcement fibers in a liquid resin.

12. The method of claim 1 wherein the solid reinforced bonding resin comprises a polymeric material.

13. The method of claim 1 wherein the pyrolyzing being effectuated in a substantially inert atmosphere to mitigate oxidation of the solid reinforced bonding resin.

14. The method of claim 1 wherein the ceramic bonding layer being further characterized by chemical bonds formed between a porous ceramic matrix and at least one of the first and second ceramic foams during pyrolysis.

15. The method of claim 1 wherein the ceramic bonding layer being further characterized by a transition material created during pyrolysis and disposed between a porous ceramic matrix and at least one of the first and second ceramic foams.

16. The method of claim 1 further comprising the step of:
    (f) densifying the ceramic bonding layer.

17. The method of claim 16 wherein the step (f) includes impregnating a secondary liquid resin into the ceramic bonding layer, curing the secondary liquid resin to form a secondary solid resin and pyrolyzing the bonding layer to ceramize the secondary solid resin.

18. A method for repairing a first ceramic foam having a damaged portion, the method comprising the steps of:
    (a) removing the damaged portion of the first ceramic foam to form an engagement surface on the first ceramic foam;
    (b) forming a second ceramic foam sized and configured to engage the engagement surface of the first ceramic foam where the damaged portion was removed;
    (c) impregnating a liquid resin with reinforcement fibers to form a liquid reinforced bonding resin;
    (d) applying the liquid reinforced bonding resin to at least one of the first and second ceramic foams;
    (e) joining the first and second ceramic foams to each other with the liquid reinforced bonding resin disposed therebetween;
    (f) curing the liquid reinforced bonding resin to form a solid reinforced bonding resin; and
    (g) pyrolyzing the solid reinforced bonding resin for adhering the first and second ceramic foams to form a ceramic bonding layer, said ceramic bonding layer characterized by a porous ceramic matrix with reinforcement fibers disposed therein.

19. The method of claim 18 wherein the solid reinforced bonding resin occupying a bondline volume and the ceramic bonding layer substantially occupying the bondline volume.

20. The method of claim 18 wherein the ceramic bonding layer being further characterized by voids disposed within a porous ceramic matrix.

21. The method of claim 18 wherein the reinforcement fibers being formed of a ceramic material.

22. The method of claim 21 wherein the reinforcement fibers being formed of silicon carbide.

23. The method of claim 21 wherein the reinforcement fibers substantially match the chemical composition of at least one of the first and second ceramic foams.

24. The method of claim 23 wherein at least one of the first and second ceramic foams being formed of silicon carbide and the reinforcement fibers being formed of silicon carbide.

25. The method of claim 18 wherein the reinforcement fibers being whisker fibers.

26. The method of claim 18 wherein the reinforcement fibers having an aspect ratio of greater than 15.

27. The method of claim 18 wherein step (c) includes providing 10 to 40 weight percent reinforcement fibers.

28. The method of claim 18 wherein step (c) includes suspending reinforcement fibers in a liquid resin.

29. The method of claim 18 wherein the solid reinforced bonding resin comprises a polymeric material.

30. The method of claim 18 wherein the pyrolyzing being effectuated in a substantially inert atmosphere to mitigate oxidation of the solid reinforced bonding resin.

31. The method of claim 18 wherein the ceramic bonding layer being further characterized by chemical bonds formed between a porous ceramic matrix and at least one of the first and second ceramic foams during pyrolysis.

32. The method of claim 18 wherein the ceramic bonding layer being further characterized by a transition material created during pyrolysis and disposed between a porous ceramic matrix and at least one of the first and second ceramic foams.

33. The method of claim 18 further comprising the step of:

(h) densifying the ceramic bonding layer.

34. The method of claim 33 wherein the step (h) includes impregnating a secondary liquid resin into the ceramic bonding layer, curing the secondary liquid resin to form a secondary solid resin and pyrolyzing the bonding layer to ceramize the secondary solid resin.

* * * * *